US009811447B2

United States Patent
Horovitz et al.

(10) Patent No.: US 9,811,447 B2
(45) Date of Patent: Nov. 7, 2017

(54) GENERATING A FINGERPRINT REPRESENTING A RESPONSE OF AN APPLICATION TO A SIMULATION OF A FAULT OF AN EXTERNAL SERVICE

(71) Applicant: HEWLETT-PACKARD DEVELOPMENT COMPANY, L.P., Houston, TX (US)

(72) Inventors: Yair Horovitz, Yehud (IL); Ira Cohen, Yehud (IL); Eli Mordechai, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 112 days.

(21) Appl. No.: 14/787,489

(22) PCT Filed: Jun. 20, 2013

(86) PCT No.: PCT/US2013/046849
§ 371 (c)(1),
(2) Date: Oct. 28, 2015

(87) PCT Pub. No.: WO2014/204470
PCT Pub. Date: Dec. 24, 2014

(65) Prior Publication Data
US 2016/0085664 A1    Mar. 24, 2016

(51) Int. Cl.
*G06F 11/00* (2006.01)
*G06F 11/36* (2006.01)
*G06F 11/26* (2006.01)

(52) U.S. Cl.
CPC ........ *G06F 11/3684* (2013.01); *G06F 11/261* (2013.01); *G06F 11/3688* (2013.01); *G06F 11/3692* (2013.01)

(58) Field of Classification Search
CPC .............. G06F 11/261; G06F 11/3684; G06F 11/3688; G06F 11/3692
See application file for complete search history.

(56) References Cited

U.S. PATENT DOCUMENTS

| 7,062,411 | B2 | 6/2006 | Hopkins et al. |
| 7,107,339 | B1 | 9/2006 | Wolters |
| 7,502,971 | B2 | 3/2009 | Cohen et al. |
| 8,266,279 | B2 | 9/2012 | Marvasti |
| 8,327,441 | B2 | 12/2012 | Kumar et al. |
| 9,451,036 | B2 * | 9/2016 | Khan ..................... H04L 12/24 |

(Continued)

FOREIGN PATENT DOCUMENTS

EP    1526679 A1    4/2005

OTHER PUBLICATIONS

Extended European Search Report received in EP Application No. 13887234.6, dated Jan. 12, 2017, 7 pages.

(Continued)

*Primary Examiner* — Charles Ehne (57) ABSTRACT

Examples disclosed herein relate to generating a fingerprint representing a response of an application to a simulation of a fault of an external service. Examples include causing simulation of a fault of an external service in a simulation of the external service, and generating a testing application fingerprint representing a response of an application to the simulation of the fault of the external service during the testing of the application.

20 Claims, 4 Drawing Sheets

(56) References Cited

U.S. PATENT DOCUMENTS

| | | | | |
|---|---|---|---|---|
| 2005/0102383 | A1* | 5/2005 | Sutler | G06Q 30/02 |
| | | | | 709/223 |
| 2005/0283664 | A1* | 12/2005 | Coulter | G06F 11/261 |
| | | | | 714/15 |
| 2007/0050686 | A1* | 3/2007 | Keeton | G06F 11/261 |
| | | | | 714/48 |
| 2008/0115029 | A1* | 5/2008 | Kusko | G01R 31/31834 |
| | | | | 714/742 |
| 2009/0177936 | A1 | 7/2009 | Koenemann et al. | |
| 2009/0281782 | A1 | 11/2009 | Bitar et al. | |
| 2011/0219385 | A1 | 9/2011 | Jacobson et al. | |
| 2012/0311128 | A1 | 12/2012 | Pechanec et al. | |
| 2013/0054792 | A1 | 2/2013 | Sharaf | |
| 2013/0080451 | A1 | 3/2013 | Bernstein et al. | |
| 2013/0132774 | A1 | 5/2013 | Somendra | |

OTHER PUBLICATIONS

Wikipedia, "Destructive testing," May 14, 2013, <https://en.wikipedia.org/w/index.php?title=Destructive_testing&oldid=555064052>.

Wikipedia, "Fault injection," May 26, 2013, <https://en.wikipedia.org/w/index.php?title=Fault_injection&oldid=556888327>.

Wikipedia, "Software testing," May 31, 2013, <https://en.wikipedia.org/w/index.php?title=Software_testing&oldid=557631819>.

Bodik, P. et al.; Fingerprinting the Datacenter: Automated Classification of Performance Crises; http://research.microsoft.com/pubs/102399/hilighter.pdf > on pp. 111-124; 2010.

Google Developers. "Google Maps Android API v2" Mar. 12, 2013. <https://developers.google.com/maps/documentation/android/start>.

Hewlett-Packard Development Company, L.P., "Accelerate cloud and composite application delivery," Nov. 2012, Data Sheet, retrieved from: <http://h20195.www2.hp.com/V2/GetDocument.aspx?docname=4AA3-5393ENW&cc=us&lc=en>.

Hewlett-Packard Development Company, L.P., "HP Service Virtualization 2.0," 2012, Fact Sheet, retrieved from: <http://www.hp.com/hpinfo/newsroom/press_kits/2012/convergedcloud2012/FS_SVC_2.0.pdf>.

International Search Report & Written Opinion, Apr. 2, 2014, PCT Patent Application No. PCT/US2013/046849, 10 pages.

Jared Smolens et al., "Fingerprinting: Bounding Soft-Error Detection Latency and Bandwidth," Oct. 7-13, 2004, ASPLOS'04, <www.ece.cmu.edu/~truss/papers/asplos04-fingerprinting.ps>.

Joab Jackson, "HP adds service virtualization tools," Dec. 18, 2012, Computerworld, retrieved from: <http://www.computerworld.com/s/article/9234851/HP_adds_service_virtualization_tools>.

Wikipedia, "Service virtualization," Apr. 5, 2013, retrieved from: <http://en.wikipedia.org/wiki/Service_virtualization>.

* cited by examiner

GENERATING A FINGERPRINT REPRESENTING A RESPONSE OF AN APPLICATION TO A SIMULATION OF A FAULT OF AN EXTERNAL SERVICE

CROSS-REFERENCE TO RELATED APPLICATION

This application is a U.S. National Stage Application of and claims priority to International Patent Application No. PCT/US2013/046849, filed on Jun. 20, 2013, and entitled "GENERATING A FINGERPRINT REPRESENTING A RESPONSE OF AN APPLICATION TO A SIMULATION OF A FAULT OF AN EXTERNAL SERVICE".

BACKGROUND

A remote computing service provider (e.g., a cloud services provider) may host a computer application for an enterprise on a computer system remote from the enterprise. The service provider may host the application to provide services to customers or other users on behalf of the enterprise. In some cases, the service provider may agree to provide the services to the users at certain predefined levels of performance. Such performance levels may be defined by, for example, a service-level agreement (SLA) or service-level objectives (SLOs).

BRIEF DESCRIPTION OF THE DRAWINGS

The following detailed description references the drawings, wherein.

DETAILED DESCRIPTION

For many reasons, including the existence of SLAs and SLOs, a remote computing service provider may have a strong interest in maintaining a high level of performance for a computer application hosted for an enterprise on a computer system remote from the enterprise. As such, the service provider may desire to accurately identify the source of a performance problem of the application when it is hosted on a computer system operated by the service provider.

However, it may be difficult to identify sources of some application performance problems. For example, an application may rely on external services that operate separate from the application and the service providers computer system. In such examples, the application may acquire data from the external services via function calls defined by, for example, an application programming interface (API) associated with the external service, or the like. Example external services may include external applications such as data feeds (e.g., rich site summary (RSS) feeds, or the like), e-mail systems, representation state transfer (REST) web services, web-based map applications, or the like.

Performance problems in an application hosted by the service provider may often be caused by a fault occurring in an external service relied upon by the hosted application. Such external service faults can cascade into multiple unexpected behaviors of the hosted application, making such external service faults difficult to identify. Additionally, since the various external services relied upon by the hosted application may be controlled by an entity (e.g., company) separate from the service provider, the service provider may be unable to induce faults in the external services to systematically test the hosted application under the conditions of a fault of the external service.

To address these issues, examples described herein may instruct an external service virtualization system to simulate a fault of an external service as part of a simulation of the external service during testing of an application. Examples may further generate a testing application fingerprint representing a response of the application to the simulation of the fault of the external service, and associate the testing application fingerprint with the simulated external service and the simulated fault in a repository storing the testing application fingerprint. In this manner, during testing of an application, examples described herein may store information that may be used to identify a failing external service as the source of a performance problem detected during non-testing execution of the application.

For example, after the testing application fingerprint is generated and associated with an external service and a fault during testing, examples described herein may evaluate the performance of the application during non-production execution. In response to detection of a problem during non-testing execution of the application, examples described herein may generate a production application fingerprint representing a state of the application. Examples may further compare the testing and production application fingerprints, and may identify the external service and the fault associated with the testing application fingerprint as sources of the detected problem based on the result of the comparison. For example, the external service and the fault associated with the testing application fingerprint may be identified as the sources of the detected problem in response to determining that the production application fingerprint is most similar to the testing application fingerprint, among a plurality of fingerprints, and that the production application fingerprint satisfies a similarity threshold relative to the testing application fingerprint.

Additionally, by utilizing a virtualization system to simulate a fault of an external service as part of an overall simulation of the external service, examples described herein may systematically test the application under conditions of a failing external service without having control of the actual external service during the testing. In this manner, examples described herein may obtain information useable to identify actual external service faults when the application is executed in a non-testing (e.g., production) environment.

Figure 1:
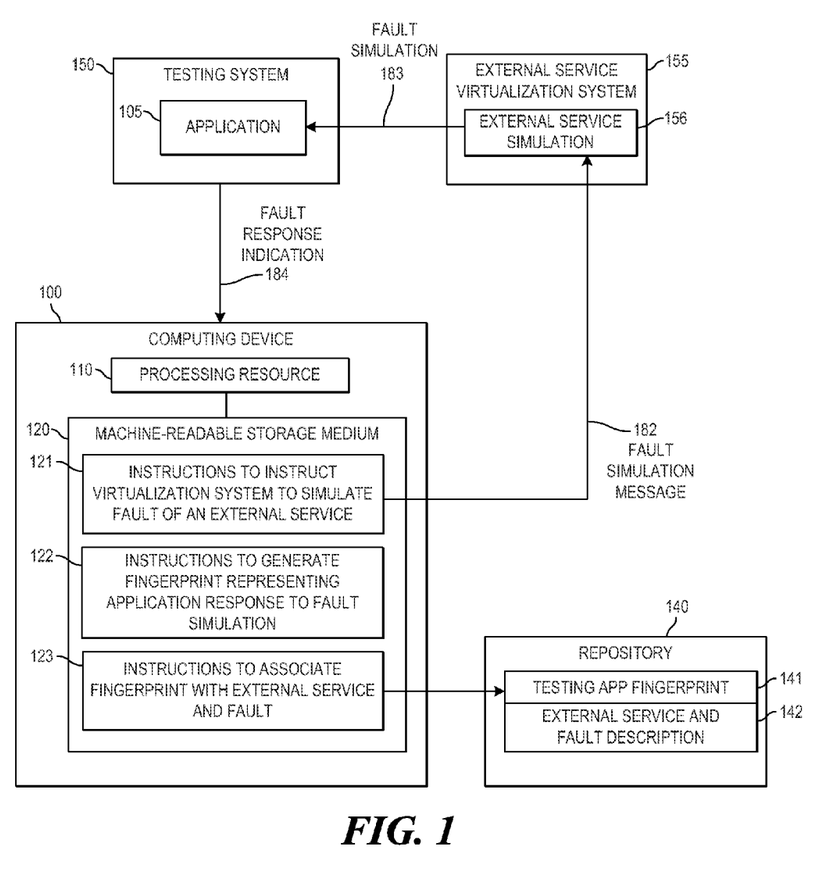
FIG. 1 is a block diagram of an example computing device to generate a testing application fingerprint representing a response of an application to the simulation of a fault of an external service.

Referring now to the drawings, FIG. 1 is a block diagram of an example computing device 100 to generate a testing application fingerprint representing a response of an application to the simulation of a fault of an external service. As used herein, a "computing device" may be a desktop computer, notebook computer, workstation, tablet computer, mobile phone, smart device, server, blade enclosure, or any other processing device or equipment. In the example of FIG. 1, computing device 100 includes a processing resource 110 and a machine-readable storage medium 120 encoded with instructions 121-123. In some examples, storage medium 120 may include additional instructions. In some examples, instructions 121-123, and any other instructions described herein in relation to storage medium 120, may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

In the example of FIG. 1, computing device 100 may be in communication with a repository 140, which may be implemented by at least one machine-readable storage medium. Although repository 140 is separate from computing device 100 in the example of FIG. 1, in other examples computing device 100 may include repository 140. As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Computing device 100 may also be in communication with a testing system 150 and an external service virtualization system 155. Testing system 150 may be any system capable of testing a computer application. As used herein, an "application" (or "computer application") is a collection of machine-readable instructions that are executable by at least one processing resource of at least one computing device. In examples described herein, an application may be a composite application to be run by several different tiers of a multi-tier computer system. In such examples, the composite application may implement a web application, web services, or the like, or a combination thereof.

Testing system 150 may be capable of testing an application with different loads, different numbers of users, various user behaviors, and the like. In the example of FIG. 1, testing system 150 may test an application 105 to be hosted on a computer system operated by a remote computing service provider, for example. Testing system 150 may be implemented on at least one computing device, and the functionalities of testing system 150 may be implemented in the form of electronic circuitry, in the form of executable instructions encoded on a machine-readable storage medium, or a combination thereof.

Testing system 150 may be in communication with external service virtualization system 155, which may be any system capable of simulating an external service for an application being tested. In examples described herein, an "external service" may be any service (e.g., web service, application, web application, system, or the like, or a combination thereof) implemented separate from a given application configured to rely upon (e.g., access, request information from, etc.) the service during execution of the given application. In the example of FIG. 1, application 105 may rely upon an external service (e.g., a data feed, a separate web application, etc.) during non-testing execution of application 105 (i.e., in production). In such examples, external service virtualization system 155 may implement a simulation 156 of the external service that application 105 may call or otherwise access during testing of application 105 by testing system 150. In other examples, system 155 may implement additional simulations, other simulations, or a combination thereof.

In examples described herein, a "simulation" of an external service may be any application or process to provide simulated response(s) to request(s) targeting the external service, such as API-defined function calls for the external service. In the example of FIG. 1, system 155 may implement simulation 156 to simulate response(s) of the external service to API-defined function call(s) for the external service by, for example, providing simulated responses (e.g., simulated data) in response to such function calls. External service virtualization system 155 may be implemented on at least one computing device, and the functionalities of system 155 may be implemented in the form of electronic circuitry, in the form of executable instructions encoded on a machine-readable storage medium, or a combination thereof.

In the example of FIG. 1, instructions 121 may instruct external service virtualization system 155 to simulate a fault of the external service simulated by the simulation 156. For example, instructions 121 may provide to system 155 a fault simulation message 182 specifying the fault of the external service to simulate. Message 182 may specify any suitable fault that may occur in the external service. For example, message 182 may instruct simulation 156 to simulate slow response times (e.g., by delaying responses to application 105), fluctuating response times (e.g., by varying response times), non-responsiveness (e.g., by providing no response to requests from application 105), or the like. In other examples, message 182 may specify any other suitable external service fault, such as providing inconsistent response(s), incorrect response(s), error(s), or the like. Message 182 may also identify the simulation 156 (or external service simulated by it) in examples in which system 155 simulates multiple external services. The fault simulation 183 performed by external service simulation 156 may include any such responses (or lack thereof), based on the fault specified in message 182.

As used herein, a "fault" of an external service (or "external service fault") may be any condition or set of conditions of the external service that cause the external service to behave abnormally. In examples described herein, a fault of an external service may be simulated by simulating effect(s) of the fault that may be experienced by an application relying on the external service, as illustrated by fault simulation 183 in FIG. 1. Examples described herein may instruct an external service virtualization system to simulate an external service fault by instructing the system to simulate effect(s) of the fault that may be experienced by an application relying on the external service.

In the example of FIG. 1, testing system 150 may monitor the performance of application 105 during testing. In such examples, testing system 150 may detect the response of application 105 to external service fault simulation 183, and provide to computing device 100 an indication 184 of the response of application 105 to the fault simulation 183 during testing of application 105. For example, testing system 150 may collect metrics. In examples described herein, a "metric" may be information quantifying or otherwise representing the performance of an application. In such examples, the performance of the application may include at least one of the functional correctness of operations of the application, measurable aspects of computing resources executing the application, and the like. As used herein, a computing resource may be a hardware component or software (i.e., processor executable instructions) component of a computing system (e.g., computer network, computing device, or the like), or a combination thereof.

Example metrics may include metrics representing the response time of the application, the availability of the application, the functional correctness of operations of the application, and the like. Other example metrics may include metrics representing processor (i.e., CPU) utilization of the application, memory utilization of the application, storage utilization (e.g., disk I/O) of the application, network utilization of the application, network activity of the application, and the like. Testing system 150 may include monitors to measure or otherwise collect various metrics representing the performance of application 105 during testing. Testing system 150 may also store information related to the performance of application 105 in various logs. In such examples, testing system 150 (e.g., monitors) may also analyze these logs to derive metrics for application 105. In some examples, a metric may include both value(s) for the metric and a description of what the metric represents (e.g., response time, etc.).

In some examples, testing system 150 may collect metrics representing the response of application 105 to fault simulation 183. For example, testing system 150 may collect metrics for application 105 during fault simulation 183, after fault simulation 183, or both. In such examples, testing system 105 may provide the collected metrics, representing the response of application 105 to fault simulation 183, to computing device 100 as the fault response indication 184 (which may comprise one or more communications between testing system 150 and computing device 100). In some examples, the metrics collected by testing system 150 may be abstracted to facilitate comparison with metrics collected during non-testing execution of application 105, as described in more detail below.

In the example of FIG. 1, instructions 122 may generate a testing application fingerprint 141 representing a response of the application, during the testing of the application, to the simulation 183 of the fault of the external service simulated by simulation 156. For example, instructions 122 may generate testing application fingerprint 141 based on the fault response indication 184 received from testing system 150. As used herein, a "fingerprint" is a collection of information representing a state of a computer application at a given time.

As noted above, in some examples, fault response indication 184 may include metrics collected for application 105 during fault simulation 183, after fault simulation 183, or both. In such examples, instructions 122 may generate a testing application fingerprint 141 indicating metrics, among the metrics received from testing system 150, that became abnormal in response to fault simulation 183. In such examples, instructions 122 may consider a metric to be abnormal if the metric (e.g., its value(s)) violates a respective abnormal threshold defined for the metric. Instructions 122 may determine, for each of the metrics, whether the metric violates its respective abnormal threshold (e.g., is below a threshold defining a lower-limit or exceeds a threshold defining an upper-limit). In some examples, the abnormal threshold for a given metric may be based on an average value for the metric, a value defined as acceptable for the metric (e.g., based on or consistent with an SLA, SLOs, etc.), or the like. In some examples, the metrics received as part of indication 184 (or derived therefrom) may be compared with metrics previously received from testing system 150 to determine whether a metric became abnormal in response to fault simulation 183.

In some examples, instructions 122 may generate testing application fingerprint 141 as a vector (array, etc.) of binary values, each representing whether a respective one of the metrics became abnormal. In other examples, instructions 122 may generate testing application fingerprint 141 in any other suitable format. In some examples, instructions 121 may instruct system 155 to simulate the same fault multiple different times, and instructions 122 may generate testing application fingerprint 141 based on the metrics received after each simulation of the fault in any suitable manner. In some examples, instructions 122 may generate a testing application fingerprint 141 indicating each of the metrics that is abnormal, in addition to those that became abnormal in response to fault simulation 183.

In the example of FIG. 1, instructions 123 may store testing application fingerprint 141 in repository 140. Instructions 123 may also associate, in repository 140, testing application fingerprint 141 with the external service simulated by simulation 156 and the fault simulated for the external service. For example, instructions 123 may associate testing application fingerprint 141 with a description 142 of the fault and the external service for which the fault was simulated. In this manner, the information in repository 140 may be used by examples described herein to identify, based on fingerprint 141, the external service and external service fault of description 142 as sources of a problem detected during non-testing execution of application 105, as described in more detail below.

In some examples, instructions 122 may also determine whether composite metrics, derived based on the received metrics, are abnormal. An example composite metric may be a pattern or profile formed by multiple received metrics, such as a utilization pattern based on metrics describing processor utilization, memory utilization, and storage utilization, respectively. In such examples, instructions 122 may determine whether such a pattern of a composite metric is abnormal based on predefined pattern(s), threshold(s), or the like. In such examples, instructions 122 may generate testing application fingerprint 141 to indicate the metrics that became abnormal among the metrics received as part of fault response indication 184, and among any composite metrics derived based on the received metrics.

In some examples, instructions 121-123 may be part of an installation package that, when installed, may be executed by processing resource 110 to implement the functionalities described herein in relation to instructions 121-123. In such examples, storage medium 120 may be a portable medium, such as a CO, DVD, or flash drive, or a memory maintained by a server from which the installation package can be downloaded and installed. In other examples, instructions 121-123 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
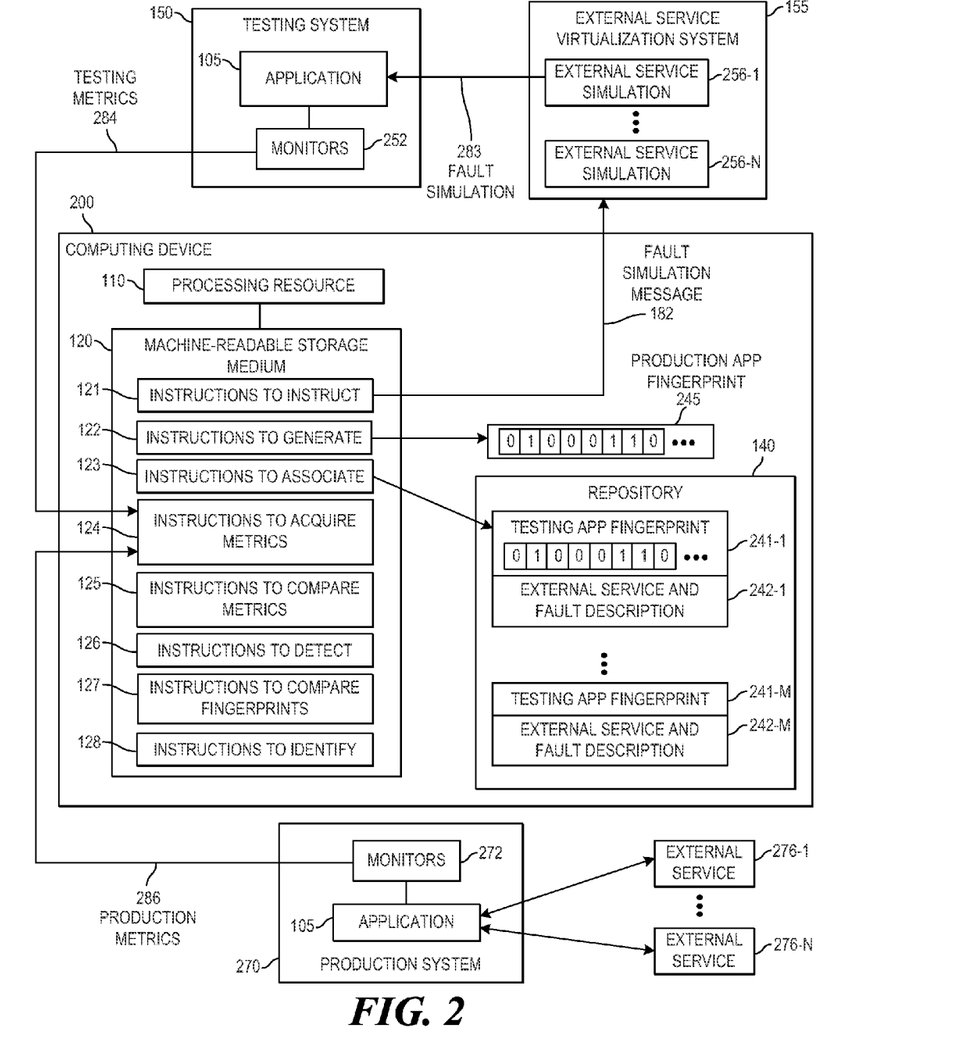
FIG. 2 is a block diagram of an example computing device to compare testing and production application fingerprints.

FIG. 2 is a block diagram of an example computing device 200 to compare testing and production application fingerprints. In the example of FIG. 2, computing device 200 comprises a processing resource 110, a machine-readable storage medium 120, and a repository 140, as described above in relation to FIG. 1. Storage medium 120 may comprise instructions 121-123, as described above in relation to FIG. 1, and instructions 124-128. In some examples, storage medium 120 may include additional instructions. In some examples, instructions 121-128, and any other instructions described herein in relation to storage medium 120, may be stored on a machine-readable storage medium remote from but accessible to computing device 200 and processing resource 110.

In the example of FIG. 2, computing device 200 may also be in communication with a production system 270, which may be a computer system capable of executing application 105 in a non-testing (e.g., "production") environment. In some examples, production system 270 may execute application 105 such that actual users, other systems, or the like, may interact with application 105 via a computer network through which production system 270 is accessible. Production system 270 may also include a plurality of monitors 272 to collect metrics for application 105 during non-testing execution. In the example of FIG. 2, production system 270 may provide production metrics 286, based on the metrics collected by monitors 272, to computing device 200. Production system 270 may be implemented by at least one computing device, and monitors 272 may be implemented in the form of electronic circuitry, in the form of executable instructions encoded on a machine-readable storage medium, or a combination thereof.

During non-testing execution on production system 270, application 105 may rely upon (i.e., access or otherwise acquire information from) external services 276-1-276-N (where "N" is an integer greater than 1) that operate separate from application 105 and production system 270. In such examples, external services 276-1-276-N may be implemented on computer system(s) separate from but accessible to production system 270.

In examples in which application 105 is a composite application, production system 270 may comprise computing devices logically grouped into multiple tiers to execute application 105. For example, production system 270 may comprise a front-end tier including gateway server(s) in communication with of back-end tier(s). Such back-end tier(s) may include, for example, a first tier including web server(s), a second tier including database server(s), and the like.

In the example of FIG. 2, computing device 200 may also be in communication with a testing system 150 and an external service virtualization system 155, as described above in relation to FIG. 1. Testing system 150 may test application 105, as described above, and external service virtualization system 155 may implement simulations 256-1-256-N of external services 276-1-278-N, respectively. In such examples, application 105 may call or otherwise access each of simulations 256-1-256-N during testing of application 105 by testing system 150, as described above in relation to FIG. 1.

As described above, instructions 121 may instruct system 155 to simulate a fault of external service 276-1, which simulated by simulation 256-1. For example, instructions 121 may provide, to system 155, a fault simulation message 182 specifying external service 276-1 (or simulation 256-1) and the fault of external service 276-1 to simulate. Message 182 may specify any suitable fault that may occur in external service 276-1, as described above. In response, simulation 256-1 may perform a fault simulation 283, as described above in relation to FIG. 1.

Testing system 150 may monitor the performance of application 105 during testing. For example, testing system 150 may collect metrics representing the performance of application 105, as described above in relation to FIG. 1. In the example of FIG. 2, testing system 150 may include a plurality of monitors 252 to collect the metrics for application 105. Monitors 252 may be implemented in the form of electronic circuitry, in the form of executable instructions encoded on a machine-readable storage medium, or a combination thereof. In the example of FIG. 2, monitors 252 may collect metrics representing the response of application 105 to fault simulation 283, as described above in relation to FIG. 1. In such examples, testing system 150 may provide to computing device 200 a plurality of testing metrics 284 that are based on the metrics collected by monitors 252 and that represent the response of application 105 to fault simulation 283.

In some examples, testing metrics 284 may be provided to computing device 200 with abstracted or otherwise generalized descriptions to facilitate comparison with metrics collected during non-testing execution of application 105. For example, application 105 may be a composite application that production system 270 may run on multiple computing resources (e.g., servers) logically divided into multiple tiers, as described above. In such examples, a given tier may include a plurality of the same type of computing resource (e.g., multiple servers) each contributing to the execution of the composite application. However, in some examples, testing system 150 may test application 105 on a smaller topology representative of the production system 270 topology. For example, the representative topology may include, for each tier, one computing resource of each type utilized by the tier (e.g., one server per tier, rather than multiple).

In such examples, metrics collected at testing and production systems 150 and 270 may be abstracted or otherwise generalized to accommodate the differences in the respective topologies utilized at testing and production systems 150 and 270. In some examples, metrics may be abstracted to the tier-level, or may be abstracted in any other suitable manner. As an example, testing system 150 may abstract the description of a processor utilization metric for a server of a tier 2 to "processor utilization of tier 2", for example. In such examples, production system 270 may collect respective metrics for processor utilization of a server 1 of tier 2, processor utilization of a server 2 of tier 2, and processor utilization of a server 3 of tier 2, and may similarly abstract the descriptions of each of these metrics to "processor utilization of tier 2", for example. In other examples, the metrics for multiple resource of the same type for a given tier may be combined (e.g., averaged, or the like) to obtain the generalized, tier-level metric. In the example of FIG. 2, the testing and production metrics 284 and 286 provided to computing device 200 may be abstracted in this or any other suitable manner to facilitate comparison.

In the example of FIG. 2, instructions 122 may generate a testing application fingerprint 241-1 representing a response of application 105 to fault simulation 283 during testing of application 105, as described above in relation to FIG. 1. As described above, instructions 122 may generate fingerprint 241-1 based on metrics collected by testing system 150. For example, instructions 124 may (actively or passively) acquire testing metrics 284 representing a response of application 105 to the simulation 283 of a fault of external service 276-1 during testing of application 105. In such examples, fingerprint 241-1 may indicate, for each of testing metrics 284 (and any derived composite metrics), whether the testing metric became abnormal in response to the simulation 283 of the fault. Whether a metric is or became abnormal may be determined by instructions 122 as described above in relation to FIG. 1. In other examples, instructions 122 may generate testing application fingerprints that indicate all abnormal metrics, as described above.

In the example of FIG. 2, instructions 122 may generate testing application fingerprint 241-1 as a vector (array, etc.) of binary values, each representing whether a respective one of the metrics became abnormal. For example, a "1" in a vector position representing a given metric may indicate that the given metric became abnormal in response to the simulation 283 of the fault, while a "0" in the vector position may indicate that the given metric did not become abnormal (or vice versa). In other examples, instructions 122 may generate testing application fingerprint 241-1 in any other suitable format.

As described above in relation to FIG. 1, instructions 123 may store testing application fingerprint 241-1 in repository 140, and may associate testing application fingerprint 241-1 with the simulated fault and external service in repository 140. For example, instructions 123 may associate testing application fingerprint 241-1 with a description 242-1 of the fault simulated and the external service 276-1 for which the fault was simulated. In some examples, instructions 121-124 may cause system 155 to simulate at least one fault in each of external services 276-1-276N (using respective simulations 256-1-250-N\ and generate testing application fingerprints 241-1-241-M (where "M" is an integer greater than 1). Instructions 123 may store testing application fingerprints 241-1-241-M in repository 140 and associate fingerprints 241-1-241-M with respective external service and fault descriptions 242-1-242-M, describing the simulated fault represented by the respective fingerprint and the external service in which the fault corresponding to the testing application fingerprint was simulated.

As described above, production system 270 may perform non-testing execution of application 105 such that actual users, other systems, etc., may access application 105, and monitors 272 may collect metrics for application 105 during the non-testing execution by system 270. The metrics collected may be any type of metric described above. In some examples, instructions 124 of computing device 200 may (actively or passively) acquire from, production system 270, a plurality of production metrics 286 representing performance of application 105 during the non-testing execution of application 105 by production system 270. Production metrics 286 may be based on the metrics collected by monitors 272, and may be abstracted or otherwise generalized versions of the collected metrics, as described above. In the example of FIG. 2, application 105 is to utilize each of external services 276-1-276-N during the non-testing execution at production system 270.

Instructions 125 may detect a problem during the non-testing execution of application 105 based on production metrics 286. In examples described herein, a "problem" during execution of an application may be inadequate performance of a computing resource involved in the execution of the application, the occurrence of a fault during the execution of the application, or any other type of unsatisfactory performance of the application during the execution. In some examples, such performance standards may be embodied in problem thresholds defined for various types of production metrics 286. In examples described herein, a problem threshold may be a threshold corresponding to at least one metric for an application, wherein violation of the threshold by the corresponding metric(s) indicates the occurrence of a problem during execution of the application. Problem thresholds may be defined based on, for example, an SLA or SLOs for the application, or any other standards for the performance of the application.

In the example of FIG. 2, instructions 125 may compare at least one of production metrics 286 to a respective problem threshold. For example, certain production metrics 286 may be considered potentially indicative of a problem (e.g., production metrics 286 representing the response time or availability of application 105) and as such may have defined problem thresholds. Other production metrics 286 (e.g., CPU utilization) may not be considered to be potentially indicative of a problem of application 105, and as such may not have a defined problem threshold. In the example of FIG. 2, instructions 125 may compare production metrics 286, for which respective problem thresholds are defined, to their respective problem thresholds. In some examples, instructions 125 may compare composite metrics derived from production metrics 286 to problem thresholds defined for those composite metrics.

In the example of FIG. 2, instructions 126 may detect a problem during the non-testing execution of application 105 in response to at least one result of the comparison(s) of instructions 125. For example, instructions 126 may detect a problem in response to at least one comparison result indicating that at least one production metric 286 or composite metric violates (e.g., exceeds, falls below, etc.) the corresponding problem threshold. In response to the detection of a problem, instructions 122 may generate a production application fingerprint 245 representing a state of application 105 at (or proximate to) the time of the detected problem. Instructions 122 may generate the production application fingerprint 245 based on production metrics 286 in any manner as described above.

Instructions 122 may generate production application fingerprint 245 in the same format as each of testing application fingerprints 241-1-241-M to facilitate subsequent comparison of the fingerprints. For example, instructions 122 may generate testing application fingerprint 245 as a vector (array, etc.) of binary values, with each vector position in fingerprint 245 representing the same type of metric as the corresponding vector position in each of fingerprints 241-1-241-M. In other examples, instructions 122 may generate fingerprints 241-1-241-M and 245 in any other suitable format (such that the fingerprints correspond to one another for comparison).

In the example of FIG. 2, instructions 127 may compare testing application fingerprint 241-1 and production application fingerprint 245. Based on the result of the comparison, instructions 128 may identify external service 276-1 and the fault associated with testing application fingerprint 241-1 (i.e., described by associated description 242-1) as sources of the detected problem.

For example, instructions 127 may compare production application fingerprint 245 to each of testing application fingerprints 241-1-241-M. In some examples, instructions 127 may determine that production application fingerprint 245 is most similar to testing application fingerprint 241-1, among the plurality of application fingerprints 241-1-241-M stored in repository 140, and determine that production application fingerprint 245 satisfies a similarity threshold relative to testing application fingerprint 241-1. In response to these determinations, instructions 128 may identify the external service (i.e., external service 276-1) and the fault of description 242-1, associated with testing application fingerprint 241-1, as sources of the detected problem.

Instructions 127 may compare application fingerprints in any suitable manner. For example, the comparison performed by instructions 127 may comprise determining a similarity score between the fingerprints. In some examples, instructions 127 may determine a similarity score between production application fingerprint 245 and each of testing application fingerprints 241-1-241-M, respectively. Instructions 127 may determine a similarity score for a pair of fingerprints in any suitable manner. For example, instructions 127 may compute a similarity score between a pair of fingerprints based on any suitable distance measure, such as a Hamming distance between the pair of fingerprints. Other example distance measures that may be used to determine a similarity score between fingerprints may include L1 and L2 norms.

In some examples, instructions 127 may also determine whether a similarity score determined for a pair of fingerprints meets a similarity threshold. In such examples, instructions 128 may determine that no fingerprint of repository 140 is a match for production application fingerprint 245 when the most similar fingerprint among testing application fingerprints 241-1-241-M has a similarity score (relative to fingerprint 245) that does not meet the similarity threshold. In this manner, examples described herein may reduce the number of false positives generated when searching for a stored fingerprint that is most similar to production application fingerprint 245.

In some examples, instructions 127 may use a predefined global similarity threshold. In other examples, a respective similarity threshold may be derived for each of testing application fingerprints 241-1-214-M. In such examples, the similarity threshold may be statistically derived. For example, for each fault to be simulated for each external service, instructions 121 may cause system 155 to simulate the fault multiple times (e.g., 20 times, etc.). In such examples, instructions 124 may acquire testing metrics 284 for each simulation of the fault, and instructions 122 may generate a fingerprint representing the response of application 105 to each of the simulations. In such examples, instructions 127 may compare each of the generated fingerprints to one another, determine an average similarity score between the fingerprints, and determine a similarity threshold for a testing application fingerprint 241-i corresponding to the simulated fault (where "i" is an integer between 1 and M, inclusive). The similarity threshold may be defined by the determined average similarity plus or minus a defined number of standard deviations from the average similarity score (e.g., distance), for example. In such examples, the similarity threshold may be defined as a range.

In other examples, fingerprints may take the form of vectors of probability values, each between 0-1 (inclusive), for example, and each representing the probability that a respective metric (represented by the vector location of the value) will become abnormal in response to an associated fault of an external service. In such examples, the probabilities may be determined by simulating each fault multiple times, as described above, and determining the probability for each given metric by determining the percentage of times the given metric became abnormal in response to the fault simulation. In some examples, the production application fingerprint 245 may be a binary vector as described above. In such examples, instructions 127 may determine the similarity score for a testing application fingerprint of probability values and a production application fingerprint 245 by summing the probability values of the testing application fingerprint that correspond to metrics that became abnormal in production, as indicated by fingerprint 245 (e.g., metrics represented by a "1" in fingerprint 245). In such examples, similarity threshold(s) may be determined in any suitable manner.

In some examples, instructions 121-128 may be part of an installation package that, when installed, may be executed by processing resource 110 to implement the functionalities described herein in relation to instructions 121-128. In such examples, storage medium 120 may be a portable medium, such as a CO, DVD, or flash drive, or a memory maintained by a server from which the installation package can be downloaded and installed. In other examples, instructions 121-128 may be part of an application, applications, or component already installed on computing device 100 including processing resource 110. In such examples, the storage medium 120 may include memory such as a hard drive, solid state drive, or the like. In some examples, functionalities described herein in relation to FIG. 2 may be provided in combination with functionalities described herein in relation to any of FIG. 1 or 3-4.

Figure 3:
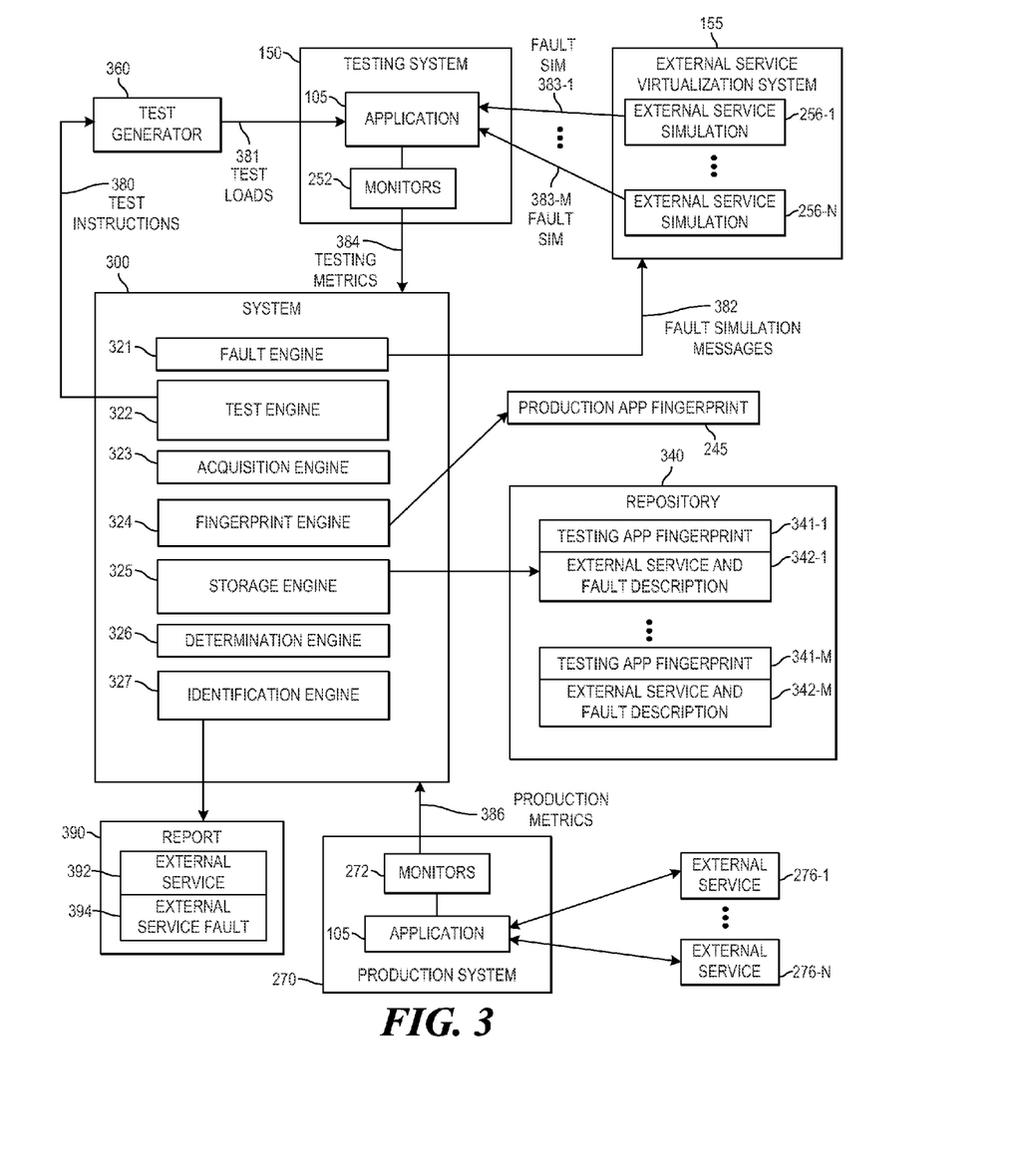
FIG. 3 is a block diagram of an example system to store a testing application fingerprint in a repository with a description of an associated external service and an associated fault of the external service.

FIG. 3 is a block diagram of an example system 300 to store a testing application fingerprint in a repository with a description of an associated external service and an associated fault of the external service. In the example of FIG. 3, system 300 includes engines 321-327, in some examples, system 300 may include additional engines.

Each of the engines of system 300 may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 300. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

In some examples, the instructions can be part of an installation package that, when installed, can be executed by the processing resource to implement system 300. In such examples, the machine-readable storage medium may be a portable medium, such as a CO, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 3, system 300 is in communication with a repository 340, which may be implemented by at least one machine readable storage medium. System 300 is also in communication a testing system 150 and an external service virtualization system 155, as described above in relation to FIGS. 1-2, and a test generator 360. System 300 is also in communication with a production system 270 that is in communication with external services 276-1-276-N, as described above in relation to FIG. 2. As described above in relation to FIG. 2, simulations 256-1-256-N of system 155 simulate external services 276-1-276-N, respectively.

In the example of FIG. 3, test engine 322 may cause testing system 150 to initiate testing of application 105. Engine 322 may also instruct test generator 360 to begin applying test loads 381 to application 105 being tested by testing system 150. Test loads 381 may include a plurality of loads that may be applied to application 105 at different times over the course of testing application 105. Test generator 360 may be implemented on at least one computing device, and the functionalities of test generator 360 may be implemented in the form of electronic circuitry, in the form of executable instructions encoded on a machine-readable storage medium, or a combination thereof.

Fault engine 321 of system 300 may instruct (e.g., via a message 382) external service virtualization system 155 to simulate a target fault of external service 276-1 in simulation 256-1. In response, simulation 256-1 may perform a simulation 383-1 of the target fault. In such examples, test engine 322 may instruct a test generator 360 to cause application 105 to access external service simulation 256-1 such that application 105 is exposed to simulation 383-1 of the target fault during testing of application 105. For example, test engine 322 may provide test instruction(s) 380 to test generator 360 to cause test generator 360 to apply test load(s) 381 that will cause application 105 to access simulation 256-1 such that application 105 is exposed to simulation 383-1 of the target fault during the testing. In such examples, test engine 322 may instruct test generator 360 to apply a test load 381 (e.g., simulated user requests, etc.) that will cause application to call external service simulation 256-1 while it is performing fault simulation 383-1 so that application 105 is exposed to fault simulation 383-1 during testing. In this manner, system 300 may coordinate the testing and fault simulation such that the application 105 under test at testing system 150 is exposed to fault simulations performed by system 155, so that the responses of application 105 to the simulated faults may be observed and corresponding fingerprints of the responses may be created.

In the example of FIG. 3, acquisition engine 323 may acquire a plurality of testing metrics 384 representing a response of application 105 to the simulation 383-1 of the target fault of external service 276-1 during the testing of application 105. Testing metrics 384 may be based on metrics collected by monitors 252 and may be abstracted or otherwise generalized, as described above. Fingerprint engine 324 may generate a testing application fingerprint 341-1 representing a response of application 105 to the simulation 383-1 of the target fault of external service 276-1 during the testing of application 105. For example, engine 324 may generate testing application fingerprint 341-1 based on acquired metrics 384, as described above in relation to FIGS. 1-2. Storage engine 325 may store the testing application fingerprint 341-1 in repository 340 with a description 342-1 of the target fault and the external service 276-1 for which the target fault was simulated. In other examples, separate descriptions of the external service and the target fault may be associated with testing application fingerprint 341-1 in repository 340.

In some examples, system 300 may generate testing application fingerprint 341-1 based on one or multiple trials of fault simulation 383-1, as described above. In some examples, fault engine 321 may instruct external service virtualization system 155 (e.g., via messages 382) to simulate the target fault of the external service multiple times and such that each simulation of the target fault coincides with different testing conditions (e.g., loads) during the testing of application 105. For example, engine 321 may instruct system 155 to perform respective fault simulations 383-1 for the target fault at various times at which different test loads 381 are to be applied to application 105 by testing system 150. In other examples, test engine 322 may cause test generator 360 to provide different test loads 381 each time fault engine 321 causes system 155 to perform a respective one of the plurality of trials to fault simulation 383-1.

In some examples, for each respective simulation 383-1 of the target fault, acquisition engine 323 may acquire a respective plurality of testing metrics 384 representing a response of the application to the respective simulation 383-1 of the target fault during the testing of application 105. In such examples, fingerprint engine 324 may combine the plurality of testing metrics 384 for each simulation 383-1 of the target fault to generate testing application fingerprint 341-1. For example, engine 324 may generate probabilities of each metric becoming abnormal in response to the simulation 383-1 based on the metrics 384 for the various trials, as described above in relation to FIG. 2.

As noted above, system 155 may implement simulations 256-1-256-N for each of external services 276-1-276-N, respectively. In some examples, for each of simulations 256-1-256-N, fault engine 321 may instruct system 155 to simulate each of a plurality of different external service faults, illustrated collectively as fault simulations 383-1-383-M. For each of the faults simulated in each of simulations 256-1-256-N, fingerprint engine 324 may generate an associated testing application fingerprint representing a response of application 105 to the fault simulated during the testing of application 105. In such examples, fingerprint engine 324 may generate testing application fingerprints 341-1-341-M representing the response of application 105 to fault simulations 383-1-383-M, respectively. In such examples, fingerprint engine 324 may generate testing application fingerprints 341-1-341-M based on testing metrics 384 representing the response of application 105 to each of fault simulations 383-1-383-M during testing. In some examples, test engine 322 may coordinate test loads 381 for the testing such that application 105 is exposed to each of fault simulations 383-1-393-M, as described above. In some examples, fault engine 321 may cause system 155 to perform each of fault simulations 383-1-383-M multiple times, and fingerprint engine 324 may generate testing application fingerprints 341-1-341-M based on the testing metrics 384 from each trial of each fault simulation. In the example of FIG. 3, for each testing application fingerprint 341-$i$ of testing application fingerprints 341-1-341-M generated by fingerprint engine 324, storage engine 325 may store the testing application fingerprint 341-$i$ in repository 340 with a description 342-$i$ of the fault and the external service associated with testing application fingerprint 341-$i$. As illustrated in FIG. 3, testing application fingerprints 341-1-341-M are associated in repository 340 with descriptions 342-1-342-M.

In the example of FIG. 3, monitors 272 may collect metrics for application 105 during non-testing execution of application 105 on production system 270 during which application 105 is to utilize each of external services 276-1-276-N. In such examples, engine 323 may acquire production metrics 386 from production system 270. Production metrics 386 may be based on the metrics collected by monitors 272 and may be abstracted or otherwise generalized, as described above.

In some examples, engine 323 may detect a problem during non-testing execution of application 105 based on production metrics 386, as described above in relation to FIG. 2. In such examples, in response to detection of the problem, fingerprint engine 324 may generate a production application fingerprint 245 representing a state of application 105 at (or proximate to) the time of the detected problem. Production application fingerprint 245 may be generated in any manner described above in relation to FIG. 2.

In the example of FIG. 3, determination engine 326 may determine a selected testing application fingerprint 341-$y$ (where "y" is an integer between 1 and M, inclusive), among testing application fingerprints 341-1-341-M stored in repository 340. In some examples, engine 326 may determine the selected testing application fingerprint 341-$y$ that is most similar to production application fingerprint 245 and that satisfies a similarity threshold relative to production application fingerprint 245. Engine 326 may determine similarity as described above in relation to FIG. 2. In some examples, identification engine 327 may identify the external service and the fault associated with the selected testing application fingerprint 341-$y$ as sources of the detected problem. For example, identification engine 327 may identify the external service and the fault of description 342-$y$, associated with the selected testing application fingerprint 341-$y$, as the sources of the detected problem. In some examples, engine 327 may further output a report 390 including an indication 392 of the external service of description 342-$y$ and including an indication 394 of the external service fault of description 342-$y$. Report 390 may be output in any suitable manner. For example, report 390 may be displayed (e.g., on a screen or other display of the computing device), provided as an alert to a user of system 300, stored in a database or log, or the like. In some examples, functionalities described herein in relation to FIG. 3 may be provided in combination with functionalities described herein in relation to any of FIGS. 1-2 and 4-5.

Figure 4:
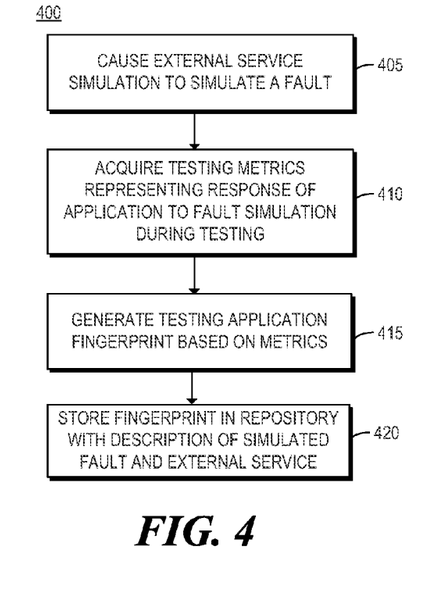
FIG. 4 is a flowchart of an example method for generating a testing application fingerprint based on acquired testing metrics.

FIG. 4 is a flowchart of an example method 400 for generating a testing application fingerprint based on acquired testing metrics. Although execution of method 400 is described below with reference to computing device 100 of FIG. 1, other suitable systems for the execution of method 400 can be utilized (e.g., computing device 200, system 300). Additionally, implementation of method 400 is not limited to such examples.

At 405 of method 400, instructions 121 may cause an external service simulation 156, utilized by application 105 during testing of application 105, to simulate a fault of the external service. For example, instructions 121 may instruct an external service virtualization system 155 to simulate a fault of the external service in simulation 156 of the external service, as described above in relation to FIG. 1. At 410, computing device 100 may acquire a plurality of testing metrics representing a response of application 105 to the simulation of the fault of the external service during the testing of application 105. The testing metrics may be included in a fault response indication 184, as described above.

At 415, instructions 122 may generate a testing application fingerprint 141 based on the acquired testing metrics. Instructions 122 may generate fingerprint 141 in any suitable manner described above. At 420, instructions 122 may store testing application fingerprint 141 in a repository 140 with an associated description 142 of the external service and the fault of the external service that was simulated.

Although the flowchart of Ha 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
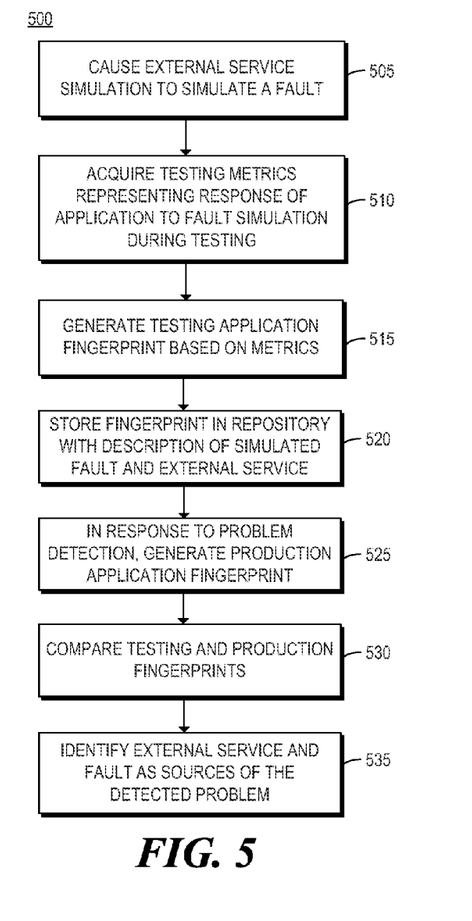
FIG. 5 is a flowchart of an example method for identifying an external service and a fault associated with a testing application fingerprint as sources of a detected problem.

FIG. 5 is a flowchart of an example method 500 for identifying an external service and a fault associated with a testing application fingerprint as sources of a detected problem. Although execution of method 500 is described below with reference to computing device 200 of FIG. 2, other suitable systems for the execution of method 500 can be utilized (e.g., computing device 100, system 300). Additionally, implementation of method 500 is not limited to such examples.

At 505 of method 500, instructions 121 may cause a simulation 156-1 of external service 276-1 to simulate a fault of the external service. For example, instructions 121 may instruct an external service virtualization system 155 to simulate a fault of external service 276-1 in simulation 156-1, which is utilized by application 105 during testing of application 105. At 510, instructions 124 may acquire a plurality of testing metrics 284 representing a response of application 105 to the simulation 283 of the fault of the external service during the testing of application 105.

At 515, instructions 122 may generate a testing application fingerprint 241-1 based on the acquired testing metrics 284. Instructions 122 may generate fingerprint 241-1 in any suitable manner described above. At 520, instructions 123 may store testing application fingerprint 241-1 in a repository 140 with an associated description 242-1 of the external service and the fault of the external service that was simulated.

At 525, in response to detection of a problem during non-testing execution of application 105 in which application 105 is to utilize external service 276-1, instructions 122 may generate a production application fingerprint 245 representing a state of application 105 at for proximate to) the time of the detected problem. At 530, instructions 127 may compare the testing and production application fingerprints 241-1 and 245. For example, instructions 127 may determine that production application fingerprint 245 is most similar to testing application fingerprint 241-1 among a plurality of application fingerprints 241-1-241-N of repository 140. Instructions 127 may also determine that testing application fingerprint 241-1 satisfies a similarity threshold relative to production application fingerprint 245 (e.g., a similarity score between testing application fingerprint 241-1 and production application fingerprint 245 satisfies a similarity threshold).

At 535, based on a result of the comparison, instructions 128 may identify external service 276-1 and the fault associated with testing application fingerprint 241-1 as sources of the detected problem. For example, in response to the above determinations that the production application fingerprint 245 is most similar to testing application fingerprint 241-1, and that the similarity threshold is satisfied, instructions 128 may identify the external service and the fault described in the description 242-1, associated with testing application fingerprint 241-1, as sources of the detected problem.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium comprising instructions executable by a processing resource to:
   instruct an external service virtualization system to simulate a fault of an external service in a simulation of the external service, wherein the simulation of the external service is accessed by an application during testing of the application;
   acquire a plurality of testing metrics representing a response of the application to the simulation of the fault of the external service during the testing of the application;
   generate a testing application fingerprint representing the response of the application to the simulation of the fault of the external service during the testing of the application, wherein the testing application fingerprint indicates, for each of the testing metrics, whether the testing metric became abnormal in response to the simulation of the fault; and
   associate the testing application fingerprint with the external service and the fault in a repository storing the testing application fingerprint.

2. The storage medium of claim 1, wherein the instructions to generate further comprise instructions to:
   generate a production application fingerprint representing a state of the application in response to detection of a problem during non-testing execution of the application, wherein the application is to utilize the external service during the non-testing execution.

3. The storage medium of claim 2, further comprising instructions executable by the processing resource to:
   compare the testing and production application fingerprints; and
   identify the external service and the fault associated with the testing application fingerprint as sources of the detected problem based on the result of the comparison.

4. The storage medium of claim 3, wherein:
   the instructions to compare comprise instructions to determine that, among a plurality of fingerprints stored in the repository, the production application fingerprint is most similar to the testing application fingerprint included in the plurality, and that the production application fingerprint satisfies a similarity threshold relative to the testing application fingerprint; and
   the instructions to identify comprise instructions to identify the external service and the fault associated with the testing application fingerprint as sources of the detected problem in response to the determination.

5. The storage medium of claim 2, further comprising instructions executable by the processing resource to:
   acquire a plurality of production metrics representing performance of the application during the non-testing execution of the application; and
   compare at least one of the production metrics to a respective problem threshold; and
   detect the problem during the non-testing execution of the application in response to at least one result of the comparison.

6. The storage medium of claim 1, further comprising instructions executable by the processing resource to:
   generate the testing application fingerprint as a binary value of "1" or "0" to indicate that a respective one the testing metrics became abnormal in response to the simulation of the fault.

7. A system comprising:
   a processor; and
   a memory storing instructions that when executed by the processor cause the processor to:
   instruct an external service virtualization system to simulate a target fault of an external service in a given simulation of the external service;
   instruct a test generator to cause the application to access the given simulation of the external service such that the application is exposed to the simulation of the target fault of the external service during testing of the application and acquire a plurality of testing metrics representing a response of the application to the simulation of the target fault of the external service during the testing of the application;
   generate a given testing application fingerprint representing the response of the application to the simulation of the target fault of the external service during the testing of the application, wherein the testing application fingerprint indicates, for each of the testing metrics, whether the testing metric became abnormal in response to the simulation of the target fault; and
   store the given testing application fingerprint in a repository with a description of the external service and the target fault of the external service.

8. The system of claim 7, wherein the instructions are to cause the processor to:
   cause a testing system to initiate the testing of the application.

9. The system of claim 8, wherein the instructions are to cause the processor to:
   instruct the external service virtualization system to simulate the target fault of the external service multiple times such that each simulation of the target fault coincides with different testing conditions for the testing of the application;
   for each respective simulation of the target fault, acquire a plurality of production metrics representing a response of the application to the respective simulation of the target fault during the testing of the application; and
   combine the plurality of production metrics for each simulation of the target fault to generate the testing application fingerprint.

10. The system of claim 9, wherein the instructions are to cause the processor to:
    for each of a plurality of simulations of different external services, instruct the external service virtualization system to simulate each of a plurality of different faults in the external service; and for each of the faults simulated in each of the simulations, generate an associated testing application fingerprint representing a response of the application to the fault simulated during the testing of the application,
wherein the plurality of simulations includes the given simulation, and the plurality of faults for the given simulation includes the target fault, and the testing application fingerprint associated with the target fault is the given testing application fingerprint.

11. The system of claim 10, wherein the instructions are to cause the processor to:
for each testing application fingerprint, store the testing application fingerprint in the repository with a description of the external service and the fault of the external service associated with the testing application fingerprint.

12. The system of claim 11, wherein the instructions are to cause the processor to:
generate a production application fingerprint representing a state of the application in response to detection of a problem during non-testing execution of the application, wherein the application is to utilize each of the external services in the non-testing execution.

13. The system of claim 12, wherein the instructions are to cause the processor to:
determine a selected testing application fingerprint, among the testing application fingerprints stored in the repository, that is most similar to the production application fingerprint and that satisfies a similarity threshold relative to the production application fingerprint; and
identify, in response to the determination, the external service and the fault associated with the selected testing application fingerprint as sources of the detected problem.

14. The system of claim 7, wherein to generate the testing application fingerprint, the instructions are to cause the processor to:
generate the testing application fingerprint as a binary value of "1" or "0" to indicate that a respective one of the testing metrics became abnormal in response to the simulation of the fault.

15. A method comprising:
causing an external service simulation, utilized by an application during testing of the application, to simulate a fault of the external service;
acquiring a plurality of testing metrics representing a response of the application to the simulation of the fault of the external service during the testing of the application;
generating, with a processing resource of a computing device, a testing application fingerprint representing the response of the application to the simulation of the fault of external service based on the acquired testing metrics, wherein the testing application fingerprint indicates, for each of the testing metrics, whether the testing metric became abnormal in response to the simulation of the fault;
storing the testing application fingerprint in a repository with an associated description of the external service and the fault of the external service;
in response to detection of a problem during non-testing execution of the application in which the application is to utilize the external service, generating a production application fingerprint representing a state of the application;

comparing the testing and production application fingerprints; and
identifying the external service and the fault associated with the testing application fingerprint as sources of the detected problem based on a result of the comparison.

16. The method of claim 15, wherein the comparing comprises:
determining that, among a plurality of application fingerprints of the repository, the production application fingerprint is most similar to the testing application fingerprint; and
determining that the testing application fingerprint satisfies a similarity threshold relative to the production application fingerprint;
wherein the identifying comprises identifying the external service and the fault associated with the testing application fingerprint as sources of the detected problem in response to the determinations.

17. The method of claim 15, wherein generating the testing application fingerprint includes:
generating the testing application fingerprint as a binary value of "1" or "0" to indicate that a respective one of the testing metrics became abnormal in response to the simulation of the fault.

18. The method of claim 15, further comprising:
instructing an external service virtualization system to simulate the target fault of the external service multiple times such that each simulation of the target fault coincides with different testing conditions for the testing of the application;
for each respective simulation of the target fault, acquiring a plurality of production metrics representing a response of the application to the respective simulation of the target fault during the testing of the application; and
combining the plurality of production metrics for each simulation of the target fault to generate the testing application fingerprint.

19. The method of claim 15, further comprising:
for each of a plurality of simulations of different external services, instructing the external service virtualization system to simulate each of a plurality of different faults in the external service; and
for each of the faults simulated in each of the simulations, generating an associated testing application fingerprint representing a response of the application to the fault simulated during the testing of the application,
wherein the plurality of simulations includes the given simulation, and the plurality of faults for the given simulation includes the target fault, and the testing application fingerprint associated with the target fault is the given testing application fingerprint.

20. A non-transitory machine-readable storage medium comprising instructions executable by a processing resource to:
instruct an external service virtualization system to simulate a fault of an external service in a simulation of the external service, wherein the simulation of the external service is accessed by an application during testing of the application;
generate a testing application fingerprint representing a response of the application to the simulation of the fault of the external service during the testing of the application;
associate the testing application fingerprint with the external service and the fault in a repository storing the testing application fingerprint;

generate a production application fingerprint representing a state of the application in response to detection of a problem during non-testing execution of the application, wherein the application is to utilize the external service during the non-testing execution;

compare the testing application fingerprint and the production application fingerprint, including determining that, among a plurality of fingerprints stored in the repository, the production application fingerprint is most similar to the testing application fingerprint included in the plurality, and that the production application fingerprint satisfies a similarity threshold relative to the testing application fingerprint; and identify the external service and the fault associated with the testing application fingerprint as sources of the detected problem in response to the determination.

\* \* \* \* \*